United States Patent [19]
Hirano et al.

[11] Patent Number: 5,927,150
[45] Date of Patent: Jul. 27, 1999

[54] APPARATUS FOR MANIPULATING A TRANSMISSION FOR A VEHICLE

[75] Inventors: Mineo Hirano; Yasuo Torii, both of Tokyo, Japan

[73] Assignee: Niles Parts Co., Ltd., Japan

[21] Appl. No.: 08/920,898

[22] Filed: Aug. 29, 1997

[30] Foreign Application Priority Data

Aug. 29, 1996 [JP] Japan .................................. 8-245457

[51] Int. Cl.$^6$ ................................................ B60K 20/00
[52] U.S. Cl. ..................... 74/473.18; 74/473.33
[58] Field of Search ................. 74/473.18, 335, 74/473.19, 471, 473.21, 473.23, 538, 473.28, 473.33

[56] References Cited

U.S. PATENT DOCUMENTS

| | | | |
|---|---|---|---|
| 4,987,792 | 1/1991 | Mueller et al. | 74/473 |
| 5,062,314 | 11/1991 | Maier et al. | 74/473 R |
| 5,127,288 | 7/1992 | Hojo et al. | 74/335 |
| 5,249,478 | 10/1993 | Moroto et al. | 74/473.18 |
| 5,415,056 | 5/1995 | Tabata et al. | 74/473.18 X |
| 5,509,322 | 4/1996 | Anderson et al. | 74/473.18 X |
| 5,791,197 | 8/1998 | Rempinski et al. | 74/473.18 |

FOREIGN PATENT DOCUMENTS

| | | |
|---|---|---|
| 3807881 A1 | 9/1989 | Germany . |
| 11-55245 | 12/1990 | Japan . |

*Primary Examiner*—John A. Jeffery
*Assistant Examiner*—Marcus Charles
*Attorney, Agent, or Firm*—Rader, Fishman & Grauer; Ronald P. Kananen

[57] ABSTRACT

An apparatus for manipulating a transmission of a vehicle, wherein speeds of transmission for the vehicle can be switched-over both automatically and manually, is provided which makes it possible to use the same switching unit for detecting whether a shift lever is positioned on a first path side at which an automatic transmission mode is executed, or on a second path side at which a manual transmission mode is executed, even if the design of the shift lever or other parts of the apparatus are changed. The apparatus includes a switching unit 5 for detecting on which side the shift lever 1 is positioned, the first path 2 side or the second path 3 side. The switching unit 5 has a first manipulating member 52 connected with a connecting portion 11 of the shift lever 1. The first manipulating member 52 is constructed so as to be a sliding bearing so that it can pivot freely around an axis O thereof.

8 Claims, 4 Drawing Sheets

APPARATUS FOR MANIPULATING A TRANSMISSION FOR A VEHICLE

BACKGROUND OF THE INVENTION

1. Field of the Invention

The present invention relates generally to an apparatus for manipulating a transmission of a vehicle, wherein speeds of transmission of the vehicle can be switched-over both automatically and manually. In particular, the present invention relates to an apparatus for manipulating a transmission of a vehicle, which is so constructed that the same switching unit for detecting whether the shift lever is positioned on a first path side, at which the automatic transmission mode is executed, or on a second path side, at which the manual transmission mode is executed, can be attached to the shift lever, even if the design of the shift lever or other components of the apparatus are changed.

2. Description of the Related Art

An apparatus has been developed recently for manipulating a transmission of a vehicle, wherein speeds of transmission of the vehicle can be switched-over both automatically and manually. This apparatus was constructed so as to be provided with a first path having an automatic transmission position, at which speeds of transmission were switched-over automatically depending on a drive state, a second path extending parallel to the first path and having a manual transmission position, at which speeds of transmission were switched-over manually, and a transverse path connecting the second path to the first path. A shift lever supported pivotably with respect to a body of the vehicle was able to be moved through the first, second, and transverse paths. A switching unit for detecting on which side the shift lever was positioned, the first path side or the second path side, was attached to the shift lever. This prior art apparatus is described, for example, in Japanese Patent Publication No. Hei 2-8545.

However, with the prior art apparatus, it was necessary to design a new switching unit each time the design of the shift lever or other components was changed. Therefore, the prior art apparatus had problems in that the kinds of switching units increased, which not only necessitated a number of management steps, but also gave rise to a risk of mounting erroneous parts and an increase in the fabrication cost of the switching unit.

SUMMARY OF THE INVENTION

It is an object of the present invention to provide an apparatus for manipulating a transmission of a vehicle that solves the problems associated with the conventional apparatus described above.

More specifically, it is an object of the present invention to provide an apparatus for manipulating a transmission of a vehicle, which is constructed so that the same switching unit can be used, even if a design of the shift lever or other components is changed.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, an apparatus for manipulating a transmission of a vehicle is provided, comprising: a shift lever supported pivotably with respect to a body of a vehicle that can be moved through a first path, a second path, and a transverse path, the first path having an automatic transmission position at which speeds of transmission are switched-over automatically depending on a drive state, the second path extending parallel to the first path and having a manual transmission position at which speeds of transmission are switched-over manually, and the transverse path connecting the second path to the first path; a switching unit for detecting on which side the shift lever is positioned, the first path side or the second path side, the switching unit being connected to a connecting portion of the shift lever; and a manipulating member engaged with a switching mechanism within the switching unit, the manipulating member being pivotable around an axis thereof.

The manipulating member of the apparatus is preferably constructed in the form of a sliding bearing. One of the connecting portion and the manipulating member is preferably made of synthetic resin. The shift lever preferably includes a first supporting shaft permitting it to pivot in a direction in which the first path and the second path extend, and a second supporting shaft permitting it to pivot in another direction in which the transverse path extends, the connecting portion being formed in one body with a block that pivots about an axis of the second supporting shaft.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A preferred embodiment of an apparatus A for manipulating a transmission according to the present invention will now be described with reference to FIGS. 1 to 7 of the drawings.

Figure 1:
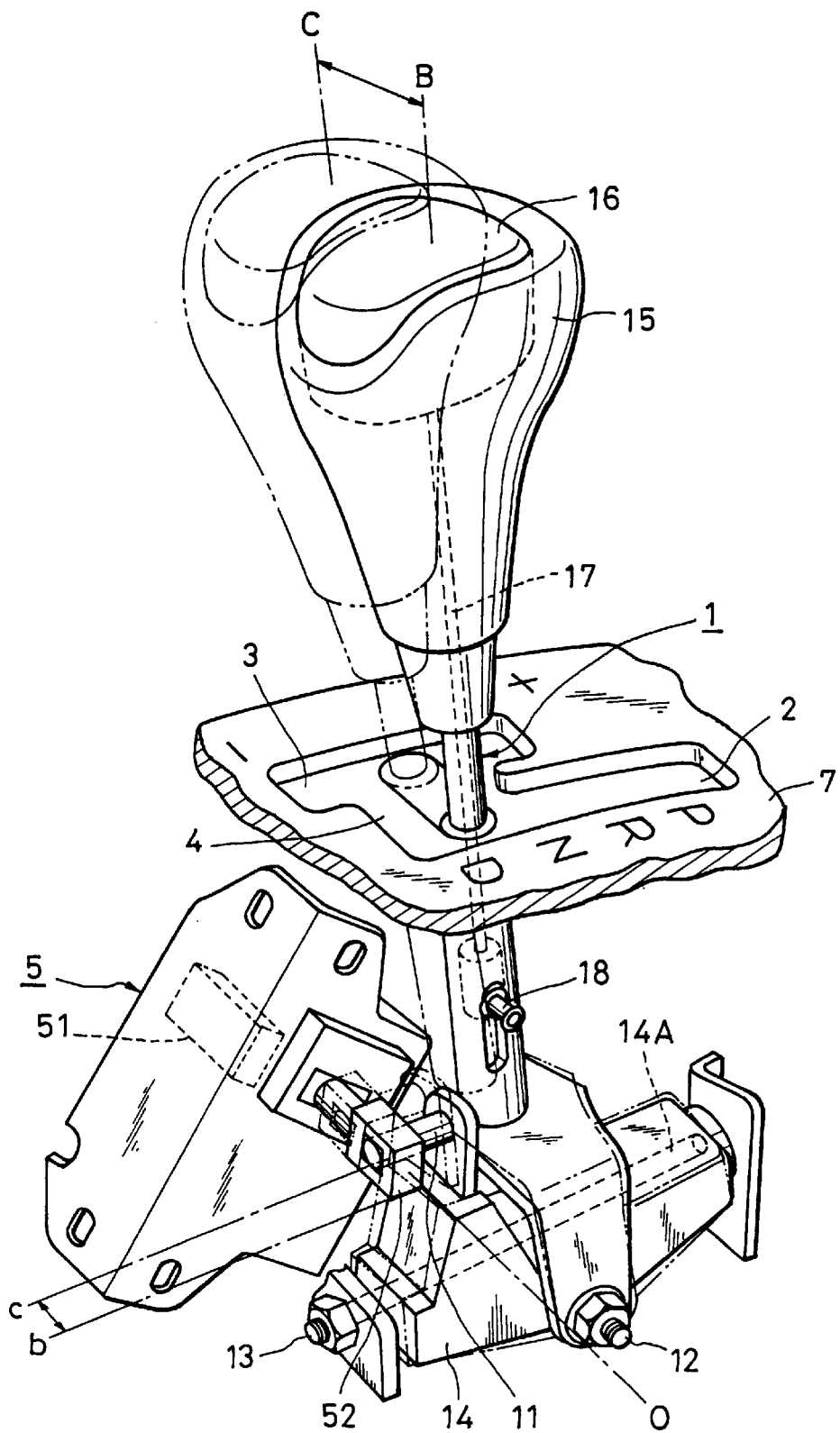
FIG. 1 is a perspective view of a principal part of an apparatus for manipulating a transmission according to the present invention.
Figure 2:
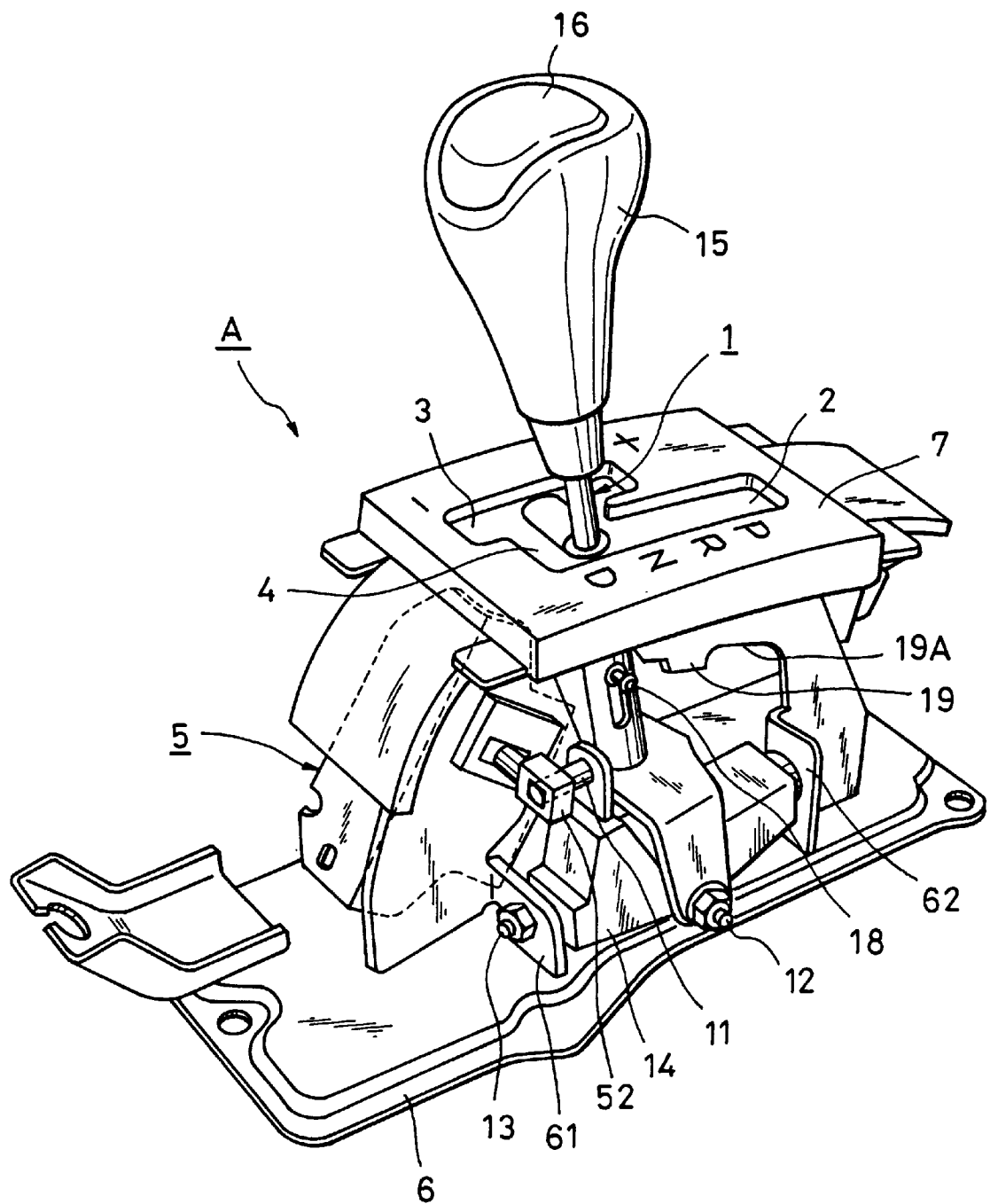
FIG. 2 is a perspective view of the apparatus shown in FIG. 1 for manipulating a transmission according to the present invention.
Figure 3:
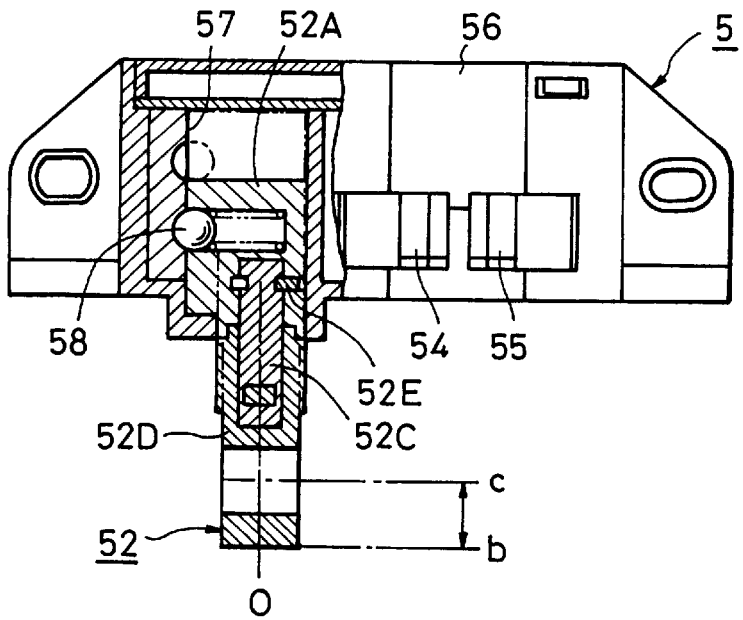
FIG. 3 is a top view of the switching unit shown in FIG. 1, in which a part thereof is cut-off.
Figure 4:
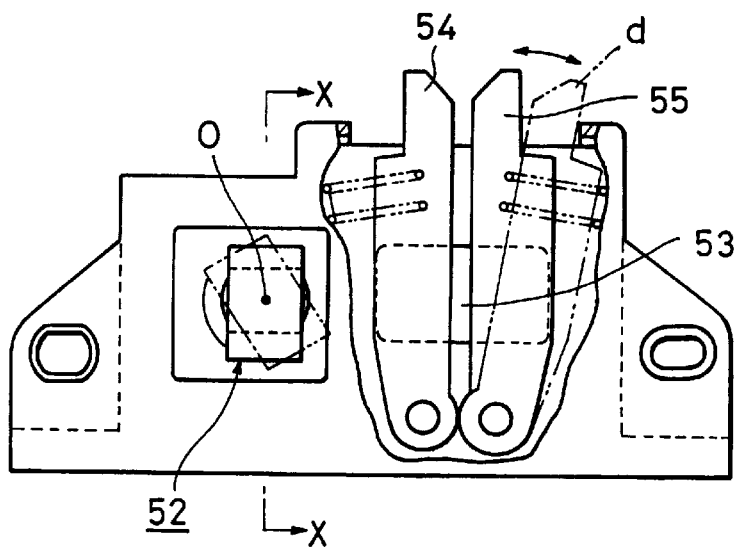
FIG. 4 is a front view of the switching unit shown in FIG. 3, in which a part thereof is cut-off.
Figure 5:
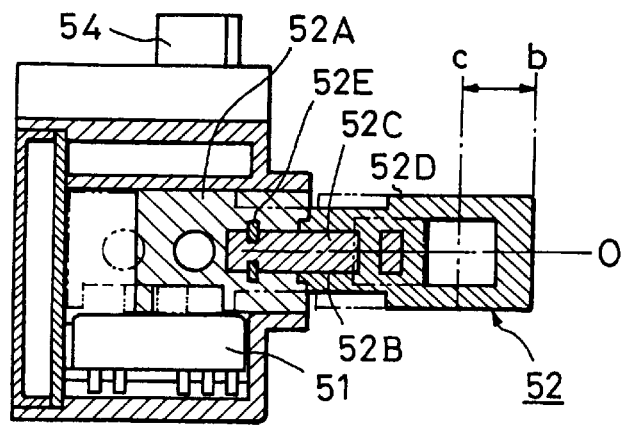
FIG. 5 is a cross-sectional view of the switching unit shown in FIG. 4, as viewed along a line X—X.

The apparatus A for manipulating a transmission is used to switch the transmission between a first mode, wherein the speeds of transmission for the vehicle are switched over automatically, and a second mode, wherein the speeds of transmission are switched over manually. As indicated in FIGS. 1 and 2, a shift lever 1 supported pivotably with respect to a body of the vehicle can be moved through a first path 2 having an automatic transmission position, at which speeds of transmission are switched over automatically depending on a drive state, a second path 3 extending parallel to the first path 2 and having a manual transmission position, at which speeds of transmission are switched over manually, and a transverse path 4 connecting the second path 3 to the first path 2. A switching unit 5 is attached to the shift lever 1 in order to detect whether the shift lever 1 is positioned at the second path 3. The paths 2, 3, 4 will be explained in more detail below.

The shift lever 1 includes a first supporting shaft 12 and a second supporting shaft 13 in a base portion thereof. The first supporting shaft 12 and the second supporting shaft 13 are constructed so as to pivotably support the shift lever 1. The supporting shaft 12 is a supporting shaft that permits the shift lever 1 to pivot in a direction in which the first and second paths 2 and 3 extend. The supporting shaft 12 is mounted on a block 14 made of synthetic resin in one body with a connecting portion 11 made of metal. On the other hand, the second supporting shaft 13 is a supporting shaft that permits the shift lever 1 to pivot in another direction, in which the transverse path 4 extends. The supporting shaft 13 passes through a hole 14A formed in the block 14. That is, the shift lever 1 is supported by a joint consisting of the first supporting shaft 12 and the second supporting shaft 13 so that the shift lever 1 can be freely pivoted in the first path 2, the second path 3, and the transverse path 4. The second supporting shaft 13 is supported by two standing portions 61 and 62, which are formed in one body by pressing a detent plate 19. The standing portions 61 and 62 as well as the detent plate 19 are welded to a base 6.

The shift lever 1 has a knob 15 in an upper part of which there is disposed a shift button 16. The shift button 16 is a member, which is operated when the shift lever 1 is positioned on the first path 2. A detent pin 18 is connected with the shift button 16 through a rod 17. The detent pin 18 is so constructed that it is out of a cam 19A formed in the detent plate 19 when the shift button 16 is operated by pushing it. Consequently, when the shift lever 1 is shifted from the P range to another range, such as the R range, the shift lever 1 is never shifted erroneously, unless the shift button 16 is operated by pushing.

The switching unit 5 shown in FIGS. 1 to 5 will now be explained. The switching unit 5 includes a first switching mechanism 51, which detects whether the shift lever 1 is positioned on the first path 2 side (B side in FIG. 1) or on the second path 3 side (C side in FIG. 1) and outputs a switching signal. The first switching mechanism 51 is engaged with a first manipulating member 52. The first switching mechanism 51 includes an automatic transmission side contact (not indicated in the figures), which is turned on when the shift lever 1 is positioned on the first path 2 side (B side in FIG. 1) and the first manipulating member 52 is drawn out to a b position as shown in FIG. 1. Similarly, the first switching mechanism 51 includes a manual transmission side contact (not indicated in the figures), which is turned on when the shift lever 1 is positioned on the second path 3 side (C side in FIG. 1) and the first manipulating member 52 is pushed in to a c position as shown in FIG. 1. These contacts are connected with a transmission controller (hereinbelow called simply "TIM controller"), which is not shown in the figures.

The first manipulating member 52 will now be explained in more detail. Since the first manipulating member 52 is connected with the connecting portion 11 of the shift lever 1, it transmits the state of the shift lever 1 to the switching mechanism 51. The switching unit 5 has nodes 57 within a case 56. The nodes 57 cooperate with a steel ball 58 disposed on the first manipulating member 52 so as to hold the first manipulating member 52 at the b position or the c position indicated in FIGS. 3 and 5.

The first manipulating member 52 is engaged with the first switching mechanism 51 and includes a sliding body 52A sliding along the nodes 57 in the case 56, a column portion 52C made of metal inserted into a round hole 52B formed in the sliding body 52A, a pivoting body 52D made of synthetic resin formed by inserting the column portion 52C, and a holding piece 52E made of metal holding the column portion 52C in the sliding body 52A. The diameter of the column portion 52C is set so as to be somewhat smaller than that of the round hole 52B so that these two members constitute a sliding bearing.

Figure 6:
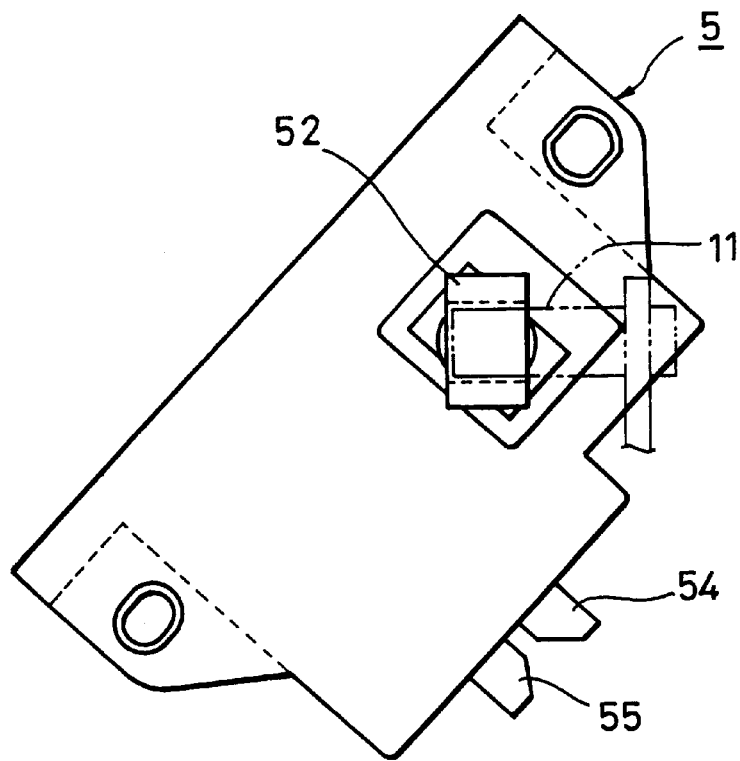
FIG. 6 is a front view showing an example of the mounting position of the switching unit shown in FIG. 3.
Figure 7:
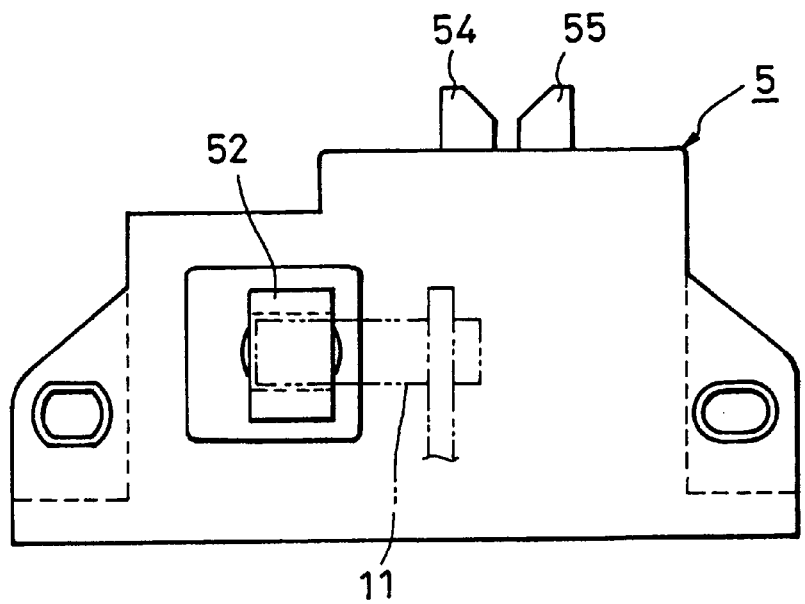
FIG. 7 is a front view showing another example of the mounting position of the switching unit indicated in FIG. 3.

In this way, the column portion 52C and the pivoting body 52D can pivot freely around the axis O indicated in FIGS. 1 and 3 to 5 in one body. Therefore, even if the design of different parts of the shift lever 1 or the apparatus A for manipulating a transmission is changed causing the mounting position of the switching unit 5 to be varied, as indicated in FIGS. 6 and 7, it is possible to easily connect the manipulating member 52 with the connecting portion 11 of the shift lever 1 by pivoting the manipulating lever 52, as described above. That is, the same switching unit 5 can be used even if the design of the shift lever 1 or other parts of the apparatus A are changed.

The switching unit 5 further includes a second switching mechanism 53. The second switching mechanism 53 detects, on the second path 3 side (C side in FIG. 1), whether the shift lever 1 is manipulated to the shift-up side (side indicated by a + sign on an indicator surface 7 in FIG. 1) or to the shift-down side (side indicated by a − sign on the indicator surface 7) and outputs a corresponding switching signal. The second switching mechanism 53 is engaged with second manipulating members 54 and 55 and includes a shift-up side contact (not indicated in the figures), which is turned on when the shift lever 1 is manipulated to the shift up side, and a shift-down side contact (not indicated in the figures), which is turned on when the shift lever 1 is manipulated to the shift down side. These contacts are connected with the TIM controller. The second manipulating members 54 and 55 are constructed so as to be able to pivot, as indicated by an imaginary line d in FIG. 4, and to turn on the second switching mechanism 53 by pivoting.

The operation of the apparatus for manipulating a transmission according to the present invention will now be explained. First, a case where the shift lever 1 is on the first path 2 (B position side indicated in FIG. 1) will be explained. At this time the manipulating member 52 of the switching unit 5 is drawn out to the b position by the connecting portion 11 of the shift lever 1. When the TIM controller judges that the shift lever 1 is positioned on the first path 2 by means of the switching signal inputted by the first switching mechanism 51 of the switching unit 5, it executes the automatic transmission mode. In the automatic transmission mode, the TIM controller automatically sets a selected speed of the transmission, depending on a manipulation position among P (parking), R (reverse), N (neutral) and D (drive) set in the first path 2 and the drive state of the vehicle.

Next, a case where the shift lever 1 is on the second path 3 (C position side indicated in FIG. 1) will be explained. At this time, the first manipulating member 52 of the switching unit 5 is pushed in to the c position by the connecting portion 11 of the shift lever 1. When the TIM controller judges that the shift lever 1 is positioned on the second path 3 by means of the switching signal inputted by the first switching mechanism 51 of the switching unit 5, it executes the manual transmission mode. In the manual transmission mode, the TIM controller receives a switching signal from the second switching mechanism 53 and determines the manipulation direction of the shift lever 1 by means of the switching signal. In the case where it is judged that the shift lever 1 is manipulated to the shift-up (+) side, speeds of the transmission are shifted up one-by-one for every manipulation. On the contrary, in the case where it is judged that the shift lever 1 is manipulated to the shift-down (−) side, speeds of the transmission are shifted down one-by-one for every manipulation. In the case where the shift lever 1 is not manipulated (i.e., the shift lever 1 is in the neutral position), a speed of the transmission at that time is maintained.

As described above, according to the present invention, an apparatus for manipulating a transmission of a vehicle is provided, which is constructed so as to be provided with a first path having an automatic transmission position, at which speeds of transmission are switched over automatically, depending on a drive state, a second path extending parallel to the first path and having a manual transmission position, at which speeds of transmission are switched over manually, and a transverse path connecting the second path with the first path as paths, through which a shift lever supported pivotably with respect to a body of the vehicle can be moved. The apparatus further comprises a switching unit for detecting on which side the shift lever is positioned, the first path side or the second path side, the switching unit being attached to a connecting portion of the shift lever, and a manipulating member engaged with a switching mechanism within the switching unit, the manipulating member being pivotable around an axis thereof. As a result of this construction, it is possible to use the same switching unit for detecting whether the shift lever is positioned on the first path side, at which the automatic transmission mode is executed, or on the second path side, at which the manual transmission mode is executed, even if the design of the shift lever or other parts of the transmission manipulating apparatus are changed. In addition, it is possible to decrease the number of design steps of the switching unit and the number of various kinds of management steps at mass production, to minimize the risk of mounting erroneous parts, and to reduce the fabrication cost of the switching unit.

Further, in the case where the manipulating member is constructed in a form of a sliding bearing, in addition to the above described effects, another beneficial effect can be obtained in that it is easy to form the manipulating member so as to be freely pivotable.

Still further, in the case where either one of the connecting portion and the manipulating member is made of synthetic resin, in addition to the above described effects, another beneficial effect can be obtained in that strange noise is minimized at contact places between the connecting portion and the manipulating member so that no unpleasant feeling is given to persons in the vehicle.

Moreover, in the case where the shift lever includes a first supporting shaft permitting it to pivot in a direction in which the first path and the second path extend, and a second supporting shaft permitting it to pivot in another direction in which the transverse path extends, the connecting portion being formed in one body with a block having the second supporting shaft, in addition to the above-described effects, still other beneficial effects can be obtained in that a relative positional relation between the connecting portion and the manipulating member is made always constant, independently from the manipulation of the shift lever, and in that the size of the connecting portion can be set at the necessary minimum.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. An apparatus for manipulating a transmission of a vehicle, comprising:

a shift lever (1) supported pivotably with respect to a body of a vehicle that can be moved through a first path (2), a second path (3), and a transverse path (4), said first path (2) having an automatic transmission position at which speeds of transmission are switched-over automatically depending on a drive state, said second path (3) extending parallel to said first path (2) and having a manual transmission position at which speeds of transmission are switched-over manually, and said transverse path (4) connecting said second path (3) to said first path (2);

a switching unit (5) for detecting on which side said shift lever (1) is positioned, the first path (2) side or the second path (3) side, said switching unit (5) being connected to a connecting portion (11) of said shift lever (1); and a manipulating member (52) engaged with a switching mechanism (51) within said switching unit (5), said manipulating member (52) being pivotable around an axis (O) thereof, and wherein said manipulating member (52) is constructed in a form of a sliding bearing.

2. The apparatus for manipulating a transmission of a vehicle according to claim 1, wherein said shift lever (1) includes a first supporting shaft (12) permitting it to pivot in a first direction in which said first path (2) and said second path (3) extend, and a second supporting shaft (13) permitting it to pivot in a second direction in which said transverse path (4) extends, said connecting portion (11) being formed in one body with block (14) through which said second supporting shaft (13) extends.

3. The apparatus for manipulating a transmission of a vehicle according to claim 1, wherein said shift lever (1) includes a first supporting shaft (12) permitting it to pivot in a first direction in which said first path (2) and said second path (3) extend, and a second supporting shaft (13) permitting it to pivot in a second direction in which said transverse path (4) extends, said connecting portion (11) being formed in one body with a block (14) that pivots about an axis of the second supporting shaft (13).

4. The apparatus for manipulating a transmission of a vehicle according to claim 1, wherein one of said connecting portion (11) and said manipulating member (52) is made of synthetic resin.

5. The apparatus for manipulating a transmission of a vehicle according to claim 4, wherein said shift lever (1) includes a first supporting shaft (12) permitting it to pivot in a first direction in which said first path (2) and said second path (3) extend, and a second supporting shaft (13) permitting it to pivot in a second direction in which said transverse path (4) extends, said connecting portion (11) being formed in one body with a block (14) through which said second supporting shaft (13) extends.

6. The apparatus for manipulating a transmission of a vehicle according to claim 1, wherein one of said connecting portion (11) and said manipulating member (52) is made of synthetic resin.

7. The apparatus for manipulating a transmission of a vehicle according to claim 6, wherein said shift lever (1) includes a first supporting shaft (12) permitting it to pivot in a first direction in which said first path (2) and said second path (3) extend, and a second supporting shaft (13) permitting it to pivot in a second direction in which said transverse path (4) extends, said connecting portion (11) being formed in one body with a block (14) through which said second supporting shaft (13) extends.

8. An apparatus for manipulating a transmission of a vehicle, comprising:

a shift lever (1) supported pivotably with respect to a body of a vehicle about first and second axes which are generally perpendicular to each other, said shift lever being moveable about said first axis through a first path (2) and a second path (3), and being moveable about said second axis through a transverse path (4), said first path (2) having an automatic transmission position at which speeds of transmission are switched-over automatically depending on a drive state, said second path (3) extending parallel to said first path(2) and having a manual transmission position at which speeds of transmission are switched-over manually, and said transverse path (4) connecting said second path (3) to said first path (2);

a switching unit (5) for detecting on which side said shift lever (1) is positioned, the first path (2) side or the second path (3) side, said switching unit (5) being connected to a connecting portion (11) of said shift lever (1); and a manipulating member (52) engaged with a switching mechanism (51) within said switching unit (5), said manipulating member (52) being pivotable around an axis (O) thereof that extends generally parallel to said first axis, said manipulating member being constructed in the form of a sliding bearing.

* * * * *